US010437624B2

(12) United States Patent
Bhasin et al.

(10) Patent No.: US 10,437,624 B2
(45) Date of Patent: Oct. 8, 2019

(54) SERVICE LEVEL BASED CATEGORIZATION OF VIRTUAL MACHINES

(71) Applicant: Hewlett Packard Enterprise Development LP, Houston, TX (US)

(72) Inventors: Gautam Bhasin, Bangalore (IN); Nico Koenig, Boeblingen (DE)

(73) Assignee: Hewlett Packard Enterprise Development LP, Houston, TX (US)

( * ) Notice: Subject to any disclaimer, the term of this patent is extended or adjusted under 35 U.S.C. 154(b) by 260 days.

(21) Appl. No.: 15/318,220

(22) PCT Filed: Apr. 30, 2015

(86) PCT No.: PCT/US2015/028632
§ 371 (c)(1),
(2) Date: Dec. 12, 2016

(87) PCT Pub. No.: WO2015/191178
PCT Pub. Date: Dec. 17, 2015

(65) Prior Publication Data
US 2017/0109191 A1    Apr. 20, 2017

(30) Foreign Application Priority Data

Jun. 10, 2014  (IN) .......................... 2835/CHE/2014

(51) Int. Cl.
G06F 9/455        (2018.01)
G06F 16/28        (2019.01)

(52) U.S. Cl.
CPC ........ G06F 9/45558 (2013.01); G06F 16/285 (2019.01); *G06F 2009/4557* (2013.01)

(58) Field of Classification Search
CPC .................................................. G06F 9/45558
See application file for complete search history.

(56) References Cited

U.S. PATENT DOCUMENTS 8,291,411 B2    10/2012  Beaty et al.
8,307,362 B1    11/2012  Gong et al.
(Continued)

FOREIGN PATENT DOCUMENTS

WO    WO-2013165369 A1    11/2013

OTHER PUBLICATIONS

Cisco, "Designing Secure Multi-tenancy Into Virtualized Data Centers," (Research Paper), Mar. 16, 2010, 40 pages.
(Continued)

*Primary Examiner* — James J Lee
*Assistant Examiner* — Steven M Do

(57) ABSTRACT

The present subject matter relates to categorizing virtual machines of a virtual machine environment into predefined service level buckets. The predefined service level buckets are indicative of different levels of application based services that are to be applied to the virtual machines. In one implementation, specifications of information technology (IT) resources allocated to each of the virtual machines are obtained. A weighted average score for each virtual machine with respect to each of the specifications of IT resources is determined. The weighted average score is indicative of a relative level of importance of the corresponding virtual machine with respect to the corresponding specification of IT resource for providing at least one business service using the virtual machine environment. Each virtual machine is assigned to one of the predefined service level buckets based on a total weighted average score for the each virtual machine.

14 Claims, 6 Drawing Sheets

(56) References Cited

U.S. PATENT DOCUMENTS

| | | | |
|---|---|---|---|
| 8,533,356 B2 | 9/2013 | Bansal et al. | |
| 8,601,471 B2 | 12/2013 | Beaty et al. | |
| 9,116,803 B1* | 8/2015 | Agrawal | G06F 11/0751 |
| 2010/0262964 A1* | 10/2010 | Uyeda | G06F 9/5044 |
| | | | 718/1 |
| 2010/0269109 A1 | 10/2010 | Cartales | |
| 2011/0320606 A1 | 12/2011 | Madduri et al. | |
| 2013/0111468 A1 | 5/2013 | Davis et al. | |
| 2013/0346967 A1 | 12/2013 | Anand et al. | |
| 2014/0068609 A1 | 3/2014 | Breitgand et al. | |
| 2014/0173113 A1* | 6/2014 | Vemuri | H04L 41/5022 |
| | | | 709/226 |

OTHER PUBLICATIONS

Gupta, D., "Scalable Virtual Machine Multiplexing," (Research Paper), University of California, San Diego, May 19, 2009, 184 pages.

Unknown, "ESXi Host HBA Priority," VCDX56, Oct. 9, 2013, 5 pages, available at http://vcdx56.com/2013/10/09/esxi-host-hba-priority/.

International Searching Authority, "Notification of Transmittal of the International Search Report and the Written Opinion", PCT/US2015/028632, Aug. 11, 2015, 11 pages.

* cited by examiner

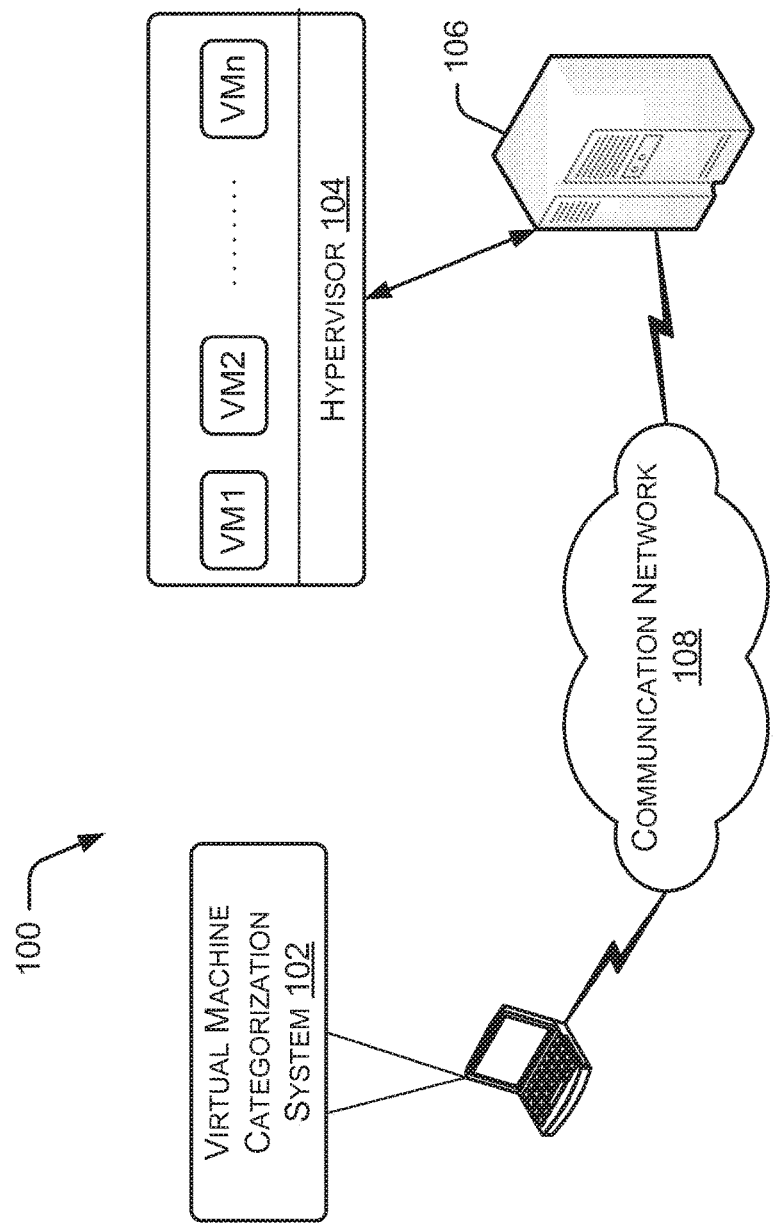

SERVICE LEVEL BASED CATEGORIZATION OF VIRTUAL MACHINES

BACKGROUND

Advancements in information technology (IT) have led to the development of virtual machine environments through which various IT related services may be provided by service owners to service customers. IT related services may include business services that may be hosted on a computing system, such as a server. A virtual machine environment generally includes a plurality of virtual machines, each virtual machine being a software implementation that emulates the performance of a physical computing system. Each virtual machine is allocated IT resources, such as processors, memory, network elements, and data storage, for providing business services in agreement with service level agreements (SLAs) between the service owners and the service customers.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

FIG. 1(a) illustrates a virtual machine environment implementing a virtual machine categorization system, according to an example of the present subject matter.

DETAILED DESCRIPTION

Figure 1B:
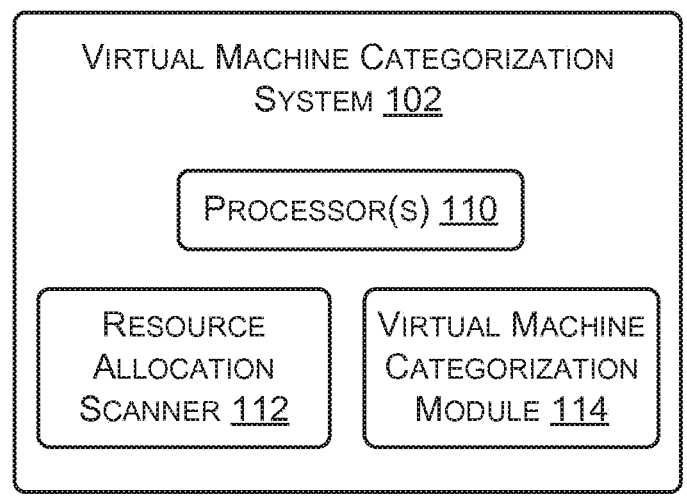
FIG. 1(b) illustrates a virtual machine categorization system, according to an example of the present subject matter.

Virtual machines in a virtual machine environment are allocated with information technology (IT) resources for providing one or more business services over a virtual machine environment. Besides allocating the IT resources, various application based services may be applied to the virtual machines. The application based services may include, but not restricted to, services that define data backup timings, data recovery timings, antivirus scan timings, OS update timings, network downtime, etc. The application based services may be defined by a service administrator and applied to the virtual machines for a substantial trouble-free provisioning of the business services through the virtual machines. The role of the service administrator is to define a right set of application based services for each virtual machine.

The application based services for a virtual machine may be defined based on the importance of the virtual machine in providing a business service. The importance or the criticality of a virtual machine may be governed by the IT resources that are allocated to the virtual machine. For this, the service administrator may have to keep a track of, or be aware of, the IT resources that are allocated to each virtual machine in the virtual machine environment. Based on the information of the allocated IT resources, the service administrator may manually define the application based services individually for each virtual machine.

Alternatively, the service administrator may manually assign a tag to each of the virtual machines or manually put the virtual machines into a logical hierarchical arrangement depending on the level of importance or criticality of each virtual machine or the allocated IT resources associated with each virtual machine, so that the virtual machines with a common tag or at a common level in the logical hierarchical arrangement can be assigned a particular set of application based services.

Generally, the IT resources that are allocated to a virtual machine may change periodically based on the demands for provisioning the business services. Keeping a track of the allocated IT resource for the virtual machines is difficult for the service administrator. Further, since the virtual machine environment may have a substantially large number of virtual machines, the manual defining of application based services individually for each of the virtual machines, or the manual tagging of each of the virtual machines, or the manual segregation of virtual machines into the logical hierarchical arrangement is difficult, laborious, time consuming, and prone to errors. Moreover, the service administrator needs to have a good understanding and knowledge of the requirements of the application based services, so that such services can be manually defined for the virtual machines.

The present subject matter relates to methods and systems of categorizing virtual machines of a virtual machine environment into different service level buckets, where each service level bucket is indicative of its importance in terms of application based services that are to be applied to the virtual machines which are grouped in that bucket. In accordance with the present subject matter, a plurality of service level buckets may be defined that are indicative of different sets or levels of application based services applicable for the virtual machines, and each of the virtual machines of the virtual machine environment may be categorized into one of the plurality of service level buckets, so that a defined set of application based services can be automatically applied to each virtual machine depending on the service level bucket of the virtual machine.

The methods and the systems of the present subject matter enable an individual, for example, a service administrator, to categorize the virtual machines of the virtual machine environment into service level buckets based on the specifications of the IT resources allocated to each of the virtual machines for providing one or more business services. With the methods and the systems of the present subject matter, substantially less manual effort is involved for defining the application based services for the virtual machines, as the service administrator has to neither keep a track of IT resources allocated to each virtual machine nor define the application based services individually for each virtual machine. With this, the defining of the application based services for the virtual machine can be less time consuming and can be done with substantially less chances of errors. Further, the categorization of the virtual machines can be performed by a service administrator, or any individual, having less knowledge and understanding of IT resource allocation and setting up of application based services for virtual machines in a virtual machine environment.

The system, in accordance with the present subject matter, may be a computing device communicatively coupled to a virtual machine environment that provides a tool for categorization of virtual machines of the virtual machine environment into service level buckets. The computing device may include, but is not limited to, a desktop computer, a laptop, a tablet, and the like. For the purpose of the description herein, an individual performing the categorization is hereinafter referred to as a user. The user may be a service administrator, or an individual, involved in defining of application level services for the virtual machines in the virtual machine environment, so that one or more business services can be provided using the virtual machines.

For categorization of virtual machines of a virtual machine environment, information of IT resources allocated to each of the virtual machines may be obtained. The IT resources that may be allocated to a virtual machine may include, but are not restricted to, processors, memory, network elements, data storage, and replica virtual machines for high availability disaster recovery (HA-DR), and the information obtained may include specifications of such IT resources, for example, number of processors, size of processor memory, type of network devices, type of data storage, and availability status of replica virtual machines for HA-DR, respectively, allocated to the virtual machine.

Based on the specification of the IT resources allocated to each of the virtual machines, user inputs indicative of relative importance score of each specification of IT resource with respect to other specifications of IT resources may be obtained from the user. The relative importance score for a first specification of IT resource with respect to the other specifications of IT resources may indicate that how important the first specification is, in comparison to the other specifications, for providing the business services using the virtual machines. The user inputs may be obtained such that a weighted average score for each virtual machine with respect to each of the specifications of IT resources can be determined based on the user inputs, where the weighted average score is indicative of a relative level of importance of the corresponding virtual machine with respect to the corresponding specification of IT resource for providing the business services using the virtual machine environment. In an implementation, the user inputs may be obtained and the weighted average scores may be determined based on a predefined decision making model used for categorizing the virtual machines. In an example, the predefined decision making model may include an analytic hierarchy process based model.

After determining the weighted average scores, a total weighted average score for each virtual machine with respect to all the specifications of IT resources may be computed. The total weighted average score for a virtual machine is indicative of a relative level of importance of that virtual machine with respect to other virtual machines.

Subsequent to computing the total weighted average scores, each virtual machine, based on its total weighted average score, can be assigned to one of the service level buckets. With this, the virtual machines of the virtual machine environment may be categorized into different service level buckets. For the purpose of assigning the virtual machines to the service level buckets, a possible range of values of total weighted average scores is distributed into multiple sub-ranges depending on the number of service level buckets, and one sub-range is associated with one service level bucket. A virtual machine is assigned to a service level bucket when the total weighted average score for the virtual machine is within the sub-range associated with the service level bucket.

The service level buckets may be predefined and, as mentioned earlier, may correspond to different levels of application based services. In an example, a higher level of application based services may refer to more frequent data backup, more frequent antivirus scan, more frequent OS update, less network downtime, etc., in comparison to a lower level of application based services. In an implementation, each of the service level buckets may be ranked depending on the level of application level services associated with the respective service level bucket. Further, a higher valued sub-range, from a possible range of total weighted average scores, may be associated with a higher ranked service level bucket. Thus, the virtual machines with a higher level of importance, indicated by the corresponding total weighted average scores, may be categorized into a higher ranked service level bucket and, thus, a higher level of application based services can be applied to more important virtual machines.

The above methods and systems are further described with reference to FIGS. 1 to 5. It should be noted that the description and figures merely illustrate the principles of the present subject matter. It is thus understood that various arrangements can be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1(a) schematically illustrates a virtual machine environment 100 implementing a virtual machine categorization system 102, according to an example of the present subject matter. The virtual machine environment 100 may be a public IT environment or a private IT environment. The virtual machine categorization system 102 may be a machine readable instructions-based implementation or a hardware-based implementation or a combination thereof. The virtual machine categorization system 102 described herein can be implemented in a computing device, such as a laptop, a desktop computer, a tablet, and the like. The virtual machine categorization system 102 in a computing device enables the categorization of virtual machines of the virtual machine environment 100, in accordance with the present subject matter, for providing business services using the virtual machine environment 100.

As shown in FIG. 1(a), the virtual machine environment 100 includes a plurality of virtual machines VM1, VM2, . . . , VMn that may operate on a hypervisor 104. The hypervisor 104 may include machine readable instructions or a hardware or a combination thereof that runs the plurality of virtual machines over a computing system 106 referred to as a host machine or system. The computing system 106 may include a server. Various IT resources, from the computing system 106 and from the virtual machine environment 100, may be allocated to each of the virtual machines for providing one or more business services through the virtual machine environment 100. For the sake of simplicity, one hypervisor 104 and one computing system 106 are depicted in FIG. 1(a); however, the virtual machine environment 100 may include multiple computing systems. i.e., the host machines, and include multiple hypervisors for running a plurality of virtual machines over the multiple computing systems.

Further, as shown in FIG. 1(a), the virtual machine categorization system 102 and the computing system 106 may be communicatively coupled to each other through a communication network 108. In another example, the virtual machine categorization system 102 may be directly coupled to the computing system 106. In an example, the virtual machine categorization system 102 can communicate with the computing system 106 for the purpose of categorizing the virtual machines into predefined service level buckets, in accordance with the present subject matter.

In an example implementation, the virtual machine categorization system 102 and the computing system 106 may be communicatively coupled over the communication network 108 through one or more communication links. The communication links are enabled through a desired form of communication, for example, via dial-up modem connections, cable links, and digital subscriber lines (DSL), wireless or satellite links, or any other suitable form of communication. The communication network 108 may be a wireless network, a wired network, or a combination thereof. The communication network 108 can also be an individual network or a collection of many such individual networks, interconnected with each other and functioning as a single large network, e.g., the Internet or an intranet. The communication network 108 can be implemented as one of the different types of networks, such as intranet, local area network (LAN), wide area network (WAN), and the internet. The communication network 108 may either be a dedicated network or a shared network, which represents an association of the different types of networks that use a variety of protocols, for example, Hypertext Transfer Protocol (HTTP), and Transmission Control Protocol/Internet Protocol (TCP/IP), to communicate with each other.

FIG. 1(b) illustrates the virtual machine categorization system 102, according to an example of the present subject matter. The virtual machine categorization system 102 includes processor(s) 110. The processor(s) 110 may be implemented as microprocessors, microcomputers, microcontrollers, digital signal processors, central processing units, state machines, logic circuitries, and/or any devices that manipulate signals based on operational instructions. Among other capabilities, the processor(s) 110 fetch and execute computer-readable instructions stored in a memory of the virtual machine categorization system 102. The functions of the various elements shown in FIG. 1(b), including any functional blocks labeled as "processor(s)", may be provided through the use of dedicated hardware as well as hardware capable of executing machine readable instructions.

As shown in FIG. 1(b), the virtual machine categorization system 102 includes a resource allocation scanner 112, and a virtual machine categorization module 114. The resource allocation scanner 112 and the virtual machine categorization module 114 are coupled to the processor(s) 110.

In an example implementation, for the purpose of categorizing of virtual machines into predefined service level buckets, a user may access the virtual machine categorization system 102. The user may include a service administrator or an Individual involved in defining or setting up of application based services for the virtual machines in the virtual machine environment 100. The details of the predefined service level buckets and the associated application based services are described later with reference to the description of FIG. 2.

In an example implementation, the resource allocation scanner 112 obtains specifications of IT resources allocated to each of the virtual machines. The specifications of IT resources allocated to a virtual machine may be understood as technical details of IT resources, and may include, but are not restricted to, number of processors, size of processing memory, type of network devices, type of data storage, and such, allocated to the virtual machine. The details of specifications of IT resources that may be obtained by the resource allocation scanner 112 are described later with reference to the description of FIG. 2.

In an example implementation, the resource allocation scanner 112 may scan the virtual machine environment 100 in real-time to identify the specifications of IT resources allocated to each of the virtual machines. The resource allocation scanner 112 may utilize an application programming interface (API) which may communicate with the computing system 106 or the virtual machines, in real-time, to obtain run-time information regarding the specifications of IT resources.

In an example implementation, the specifications of the IT resources allocated to each virtual machine in the virtual machine environment 100 may be regularly updated/stored in a database (not shown). The resource allocation scanner 112 may communicate with such a database to obtain the specifications of IT resources for the virtual machines. In an example, the database may be populated with the specifications, in real-time, through the API used for scanning the virtual machine environment 100.

For categorizing the virtual machines into the predefined service level buckets, the virtual machine categorization module 114 presents the obtained specifications of the IT resources to the user and receives user inputs that are indicative of a relative importance score of each specification of IT resource with respect to other specifications of IT resources for providing the business services using the virtual machine environment 100. The user inputs may be obtained based on a predefined decision making model that may enable the user to compare the specifications of IT resources and make or take decisions regarding relative importance of the specifications for providing the business services. In an example, the decision making model may include, but is not restricted to, an analytic hierarchy process based model.

Further, based on the user inputs, the virtual machine categorization module 114 determines a weighted average score for each virtual machine with respect to each of the specifications of IT resources. A weighted average score of a virtual machine with respect to a specification is indicative of a relative level of importance of the virtual machine with respect to the specification, for providing the business services. The weighted average score is determined from the user inputs and based on the predefined decision making model used by the virtual machine categorization system 102.

After this, the virtual machine categorization module 114 computes a total weighted average score for each virtual machine. The total weighted average score for a virtual machine may be computed as a sum of the weighted average scores of the virtual machine with respect to all the specifications of the IT resources. Further, the virtual machine categorization module 114 assigns each virtual machine to one of the predefined service level bucket based on the total weighted average score for the respective virtual machine. The procedure of assigning the virtual machines to the predefined service level buckets is described later with reference to the description of FIG. 2. Once the virtual machines are categorized into the predefined service level buckets, the application based services associated with a respective service level bucket can be applied to the virtual machines present in the respective service level bucket.

Figure 2:
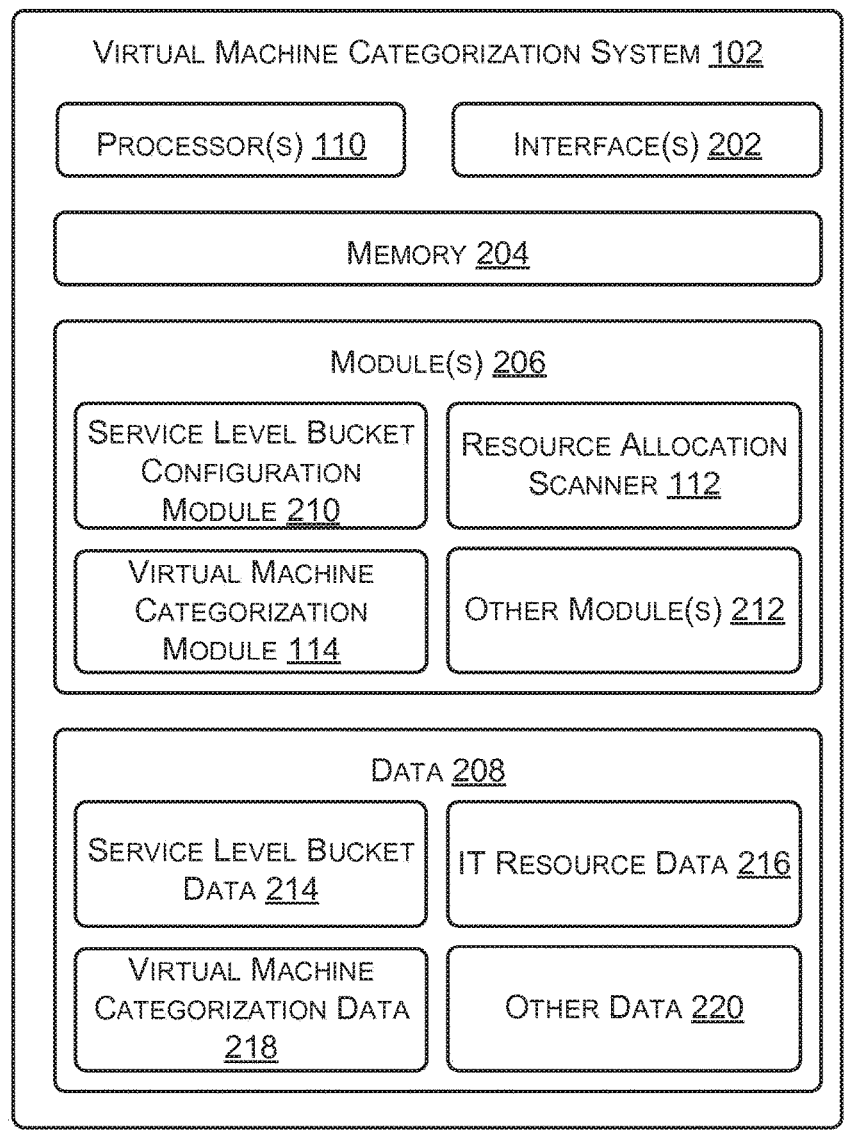
FIG. 2 illustrates the virtual machine categorization system, according to an example of the present subject matter.

FIG. 2 illustrates the virtual machine categorization system 102, according to an example of the present subject matter. The virtual machine categorization system 102 includes the processor(s) 110 and also interface(s) 202. The interface(s) 202 may include a variety of machine readable instruction-based and hardware interfaces that allow the virtual machine categorization system 102 to interact with the computing system 106, and other devices or components in the virtual machine environment 100. Further, the interface(s) 202 may enable the virtual machine categorization system 102 to communicate with other devices, such as network entities, web servers, and other external repositories.

Further, the virtual machine categorization system 102 includes memory 204, coupled to the processor(s) 110. The memory 204 may include any computer-readable medium including, for example, volatile memory (e.g., RAM), and/or non-volatile memory (e.g., EPROM, flash memory, NVRAM, memristor, etc.).

Further, the virtual machine categorization system 102 includes module(s) 206 coupled to the processor(s) 110. The module(s) 206, amongst other things, include routines, programs, objects, components, data structures, and the like, which perform particular tasks or implement particular abstract data types. The module(s) 206 further include modules that supplement applications on the virtual machine categorization system 102, for example, modules of an operating system.

The module(s) 206 of the virtual machine categorization system 102 includes a service level bucket configuration module 210, the resource allocation scanner 112, the virtual machine categorization module 114, and other module(s) 212. The other module(s) 212 may include programs or coded instructions that supplement applications and functions, for example, programs in the operating system of the virtual machine categorization system 102.

Further, the virtual machine categorization system 102 includes data 208. The data 208 serves, amongst other things, as a repository for storing data that may be fetched, processed, received, or generated by the module(s) 206. Although the data 208 is shown internal to the virtual machine categorization system 102, it may be understood that the data 208 can reside in an external repository (not shown in the figure), which may be coupled to the virtual machine categorization system 102. The virtual machine categorization system 102 may communicate with the external repository through the interface(s) 202 to obtain information from the data 208.

In an example implementation, the data 208 of the virtual machine categorization system 102 includes service level bucket data 214, IT resource data 216, virtual machine categorization data 218, and other data 220. The other data 220 comprises data corresponding to other module(s) 212.

The description hereinafter describes, in detail, the procedure of categorizing the virtual machines of the virtual machine environment 100 using the virtual machine categorization system 102, in accordance with an example implementation. The description herein describes the categorization of virtual machines into predefined service level buckets using an analytic hierarchy process based model. It may be understood that the present subject matter is by no means restricted to the use of analytic hierarchy process based model, and any decision making model can be used by the virtual machine categorization system 102, which may allow the user to compare the specifications of IT resources allocated to the virtual machines, make or take decisions regarding relative importance of the specifications for providing the business services using the virtual machine environment 100, and determine a weighted average score for each virtual machine with respect to each of the specifications for the purpose categorization.

The service level bucket configuration module 210 may present the information associated with predefined service level buckets to a user. The information may include, but is not restricted to, a name and application based services associated with each of the predefined service level buckets. The name of each predefined service level bucket may be a rank-based name, for example, "Platinum", "Gold", "Silver", and "Bronze". The service level bucket having a higher rank name is associated with a higher level of application based services that may be applicable to the virtual machines. In an implementation, the application based services may include, but are not restricted to, data backup, antivirus scan, OS update, network connectivity, and such. The level of application based services may be governed by the data backup timing, the antivirus scan timing, the OS update timing, the network downtime, and so on Thus, a higher level of application based services may include services that refer to more frequent data backup, more frequent antivirus scan, more frequent OS update, less network downtime, and so on.

Further, the information associated with each predefined service level bucket may also include a sub-range of total weighted average scores, from within a possible range of total weighted average score for a virtual machines, based on which the virtual machines may be categorized by the virtual machine categorization system 102. The service level bucket having a higher rank name has a higher valued sub-range associated therewith. For example, if the number of predefined service level bucket is four, and if the possible range of total weighted average score for a virtual machine is x0 to x4, then sub-ranges are defined as ($\geq$x0 to $\leq$x1), (>x1 to $\leq$x2), (>x2 to $\leq$x3), and (>x3 to $\leq$x4), may be associated with the four service level buckets, in accordance with the rank of the respective service level bucket. In an example, the values of x1, x2, and x3 may be such that the sub-ranges are distributed equally or unequally with respect to each other.

Table 1 illustrates the information associated with the predefined service level buckets, according to an example implementation, which may be presented to the user. It may be noted that the level of application based services and the sub-range values are increasing in the order of ranking of the service level buckets governed by the associated rank-based names. The levels of the application based services and the sub-ranges illustrated in Table 1 are for the purpose of explanation and are by no means restricted to the examples mentioned herein. Other similar levels of application based services and sub-ranges are also possible. The information associated with the predefined service level buckets may be stored in the service level bucket data 214.

TABLE 1

| Name of service level bucket | Associated Application based Services | Associated sub-range of total weighted average score |
|---|---|---|
| Bronze | Data backup timing: once a week, with no incremental backups; Antivirus timing: once a month; OS update timing: No; Network downtime: 1 day; | ($\geq$ x0 to $\leq$ x1) |

TABLE 1-continued

| Name of service level bucket | Associated Application based Services | Associated sub-range of total weighted average score |
|---|---|---|
| ... | ... | |
| Silver | Data backup timing: once a week, with incremental backups in 3 days; Antivirus timing: once a week; OS update timing: once in 6 months; Network downtime: 2 hours; ... | (> x1 to ≤ x2) |
| Gold | Data backup timing: once a week, with incremental backups in 24 hours; Antivirus timing: once in 2 days; OS update timing: once in 3 months; Network downtime: 30 minutes; ... | (> x2 to ≤ x3) |
| Platinum | Data backup timing: once a week, with incremental backups in every 12 hours; Antivirus timing: daily; OS update timing: once in 1 month; Network downtime: 5 minutes; ... | (> x3 to ≤ x4) |

In an example implementation, the user may be allowed to configure the predefined service level buckets. In this, the user may be allowed to redefine the application based services and/or the sub-range associated with any predefined service level bucket. The user may also be allowed to alter the number of predefined service level buckets by adding a new service level bucket with defined application based services and a sub-range, or delete an existing service level bucket. The predefined service level buckets if configured by the user may be stored, for example, in the service level bucket data 214, and used for categorizing the virtual machines.

Further, the resource allocation scanner 112 obtains specifications of IT resources allocated to each of the virtual machines. The resource allocation scanner 112 may then arrange each of the specifications of IT resources under one of a plurality of IT resource types. In an example, the specification indicative of a number of processor may be arranged under an IT resource type "processors", the specification indicative of a size of processing memory may be arranged under an IT resource type "processing memory", the specification indicative of a type of data storage may be arranged under an IT resource type "data storage", the specification indicative of a type of network device may be arranged under an IT resource type "network device", and so on.

Table 2 illustrates a few examples of IT resource types and specifications of IT resources under the IT resource types. It may be noted that a specification of IT resource may either be to a specific IT resource allocated to a virtual machine or be within a range of number or size of IT resource as illustrated in Table 2. It may be understood that one or more specifications of IT resource under each IT resource type may be associated with each virtual machine.

The IT resource types and the specification of IT resources illustrated in Table 2 are for the purpose of explanation, and are by no means restricted to the examples mentioned herein. Other IT resource types and specification of IT resources are also possible. The data associated with the IT resource types and the specifications of IT resources may be stored in the IT resource data 216. In Table 2, EVA stands for enterprise virtual array, iSCSI stands for internet small computer system interface, and NFS stands for network file system.

TABLE 2

| IT resource type | Specifications of IT resources |
|---|---|
| processors | <4 |
| | >4 to <8 |
| | >8 |
| processing memory | >1 GB to <4 GB |
| | >4 GB to <8 GB |
| | >8 GB to <16 GB |
| | >16 GB |
| data storage | 3PAR |
| | EVA |
| | iSCSI |
| | XP Array |
| | NFS |
| network devices | VSS |
| | DVS |

After the specifications of IT resources are obtained and arranged under the plurality of IT resource types, the virtual machine categorization module 114 presents the plurality of IT resource types and the specifications of IT resource under each IT resource type to the user. Subsequent to this, the virtual machine categorization module 114 may receive user inputs including a relative importance score for each pair of IT resource types presented to the user. The relative importance score of a pair of IT resource types is indicative of importance of one IT resource type with respect to the other IT resource type of the pair for providing business services using the virtual machine environment 100. Similarly, the virtual machine categorization module 114 may receive user inputs including a relative importance score for each pair of specifications of IT resources presented to the user. The relative importance score of a pair of specifications of IT resources is indicative of importance of one specification of IT resource with respect to the other specification of IT resource of the pair for providing business services using the virtual machine environment 100. The relative importance scores may be obtained for a pair of specifications under the same IT resource type. Further, the virtual machine categorization module 114 may receive user inputs including a relative importance score for each pair of virtual machines present in the virtual machine environment 100. The relative importance score of a pair of virtual machines is indicative of importance of one virtual machine with respect to the other virtual machine of the pair for providing business services using the virtual machine environment 100.

In an implementation, the relative importance scores, selected by the user for the user inputs, may be from a predefined scale. In an example, the predefined scale of relative importance scores is for a pair for entries. For the present subject matter, the entries include the IT resource types, the specifications of IT resources, and the virtual machines. In an example, the predefined scale may include relative importance scores from 1 to 5, where 1 may define that both the entries of a pair have equal importance, 2 may define that one of the entries of a pair is moderately important than the other entry, 3 may define that one of the entries of a pair is strongly important than the other entry, 4 may define that one of the entries of a pair is very strongly important than the other entry, and 5 may define that one of the entries is extremely important than the other entry. The scale of relative importance scores as described above is for the purpose of explanation, and is by no means restricted to the example mentioned herein. Another similar scale with other integers or fraction values is also possible.

The predefined scale may be presented to the user, and the user may select a relative importance score for each pair of IT resource types, select a relative importance score for each pair of specifications of IT resources, and select a relative importance score for each pair of virtual machines for providing the user inputs. While selecting a relative importance score for a pair of IT resource types, or for a pair of specifications of IT resources, the user may also provide an input indicative of which IT resource type or which specification of IT resource from the corresponding pair is moderately, strongly, very strongly, or extremely important with respect to the other.

In an example, for a pair of IT resource types "processors" and "data storage", the "data storage" may be moderately important than the "processors". Thus, with reference to the example of the predefined scale defined above, the user may select a relative importance score of 2 in favor of the "data storage" with respect to the "processors". Similarly, in an example, for a pair of IT resource types "processing memory" and "data storage", the "data storage" may be strongly important than the "processing memory". Thus, with reference to the example of the predefined scale defined above, the user may select a relative importance score of 3 in favor of the "data storage" with respect to the "processing memory".

Further, in an example, the user may select a relative importance score of 1 for each pair of virtual machines, as each virtual machine may be equally important with respect to the other virtual machine for providing the business services using the virtual machine environment 100.

After receiving the user inputs, as described above, the virtual machine categorization module 114 may determine a weighted average score for each virtual machine with respect to each of the specifications of IT resources. For this, the virtual machine categorization module 114 may apply the analytic hierarchy process to compute, from the user inputs, a value of global priority for each virtual machine with respect to each of the specifications of IT resources. The value of global priority for a virtual machine with respect to a specification may then be considered as the weighted average score for the virtual machines with respect to the specification. It may be noted that, for determining the weighted average scores, the virtual machine categorization module 114 may determine the relative importance score for each specification of IT resource with respect to each of the other specifications of IT resources using the analytic hierarchy process over the user inputs.

After this, the virtual machine categorization module 114 computes a total weighted average score for each virtual machine by adding the weighted average scores of the virtual machine with respect to all the specifications of the IT resources. Subsequent to this, the virtual machine categorization module 114 assigns each virtual machine to one of the predefined service level bucket, based on the total weighted average score for the respective virtual machine, for the purpose of categorizing the virtual machines. With reference to the example predefined service level buckets described in Table 1, a virtual machine is assigned to the "Bronze" service level bucket if the corresponding total weighted average score is within the sub-range ($\geq x0$ to $\leq x1$), a virtual machines is assigned to the "Silver" service level bucket if the corresponding total weighted average score is within the sub-range ($>x1$ to $\leq x2$), a virtual machines is assigned to the "Gold" service level bucket if the corresponding total weighted average score is within the sub-range ($>x2$ to $\leq x3$), and a virtual machines is assigned to the "Platinum" service level bucket if the corresponding total weighted average score is within the sub-range ($>x3$ to $\leq x4$). The data depicting the predefined service level bucket for each virtual machine may be stored in the virtual machine categorization data 218.

Further, in an example implementation, the data that depicts the predefined service level bucket for each virtual machine may be presented to the user. If, according to the user, one or more virtual machines are not assigned to, or categorized into, a correct service level bucket, then the user may take steps to correct the categorization. In an example, the user may be able to determine that a virtual machine is not in a correct service level bucket, if the application based services associated with that service level bucket are not the correct services that are to be applied to the virtual machine. Further, if, according to the user, a large number of virtual machines are categorized into the "Platinum" service level bucket in comparison to the "Silver" or the "Bronze" service level bucket, the user may take steps to correct the categorization. In an example, to correct the categorization, the user may alter the sub-ranges that are associated with the predefined service level buckets.

Figure 3:
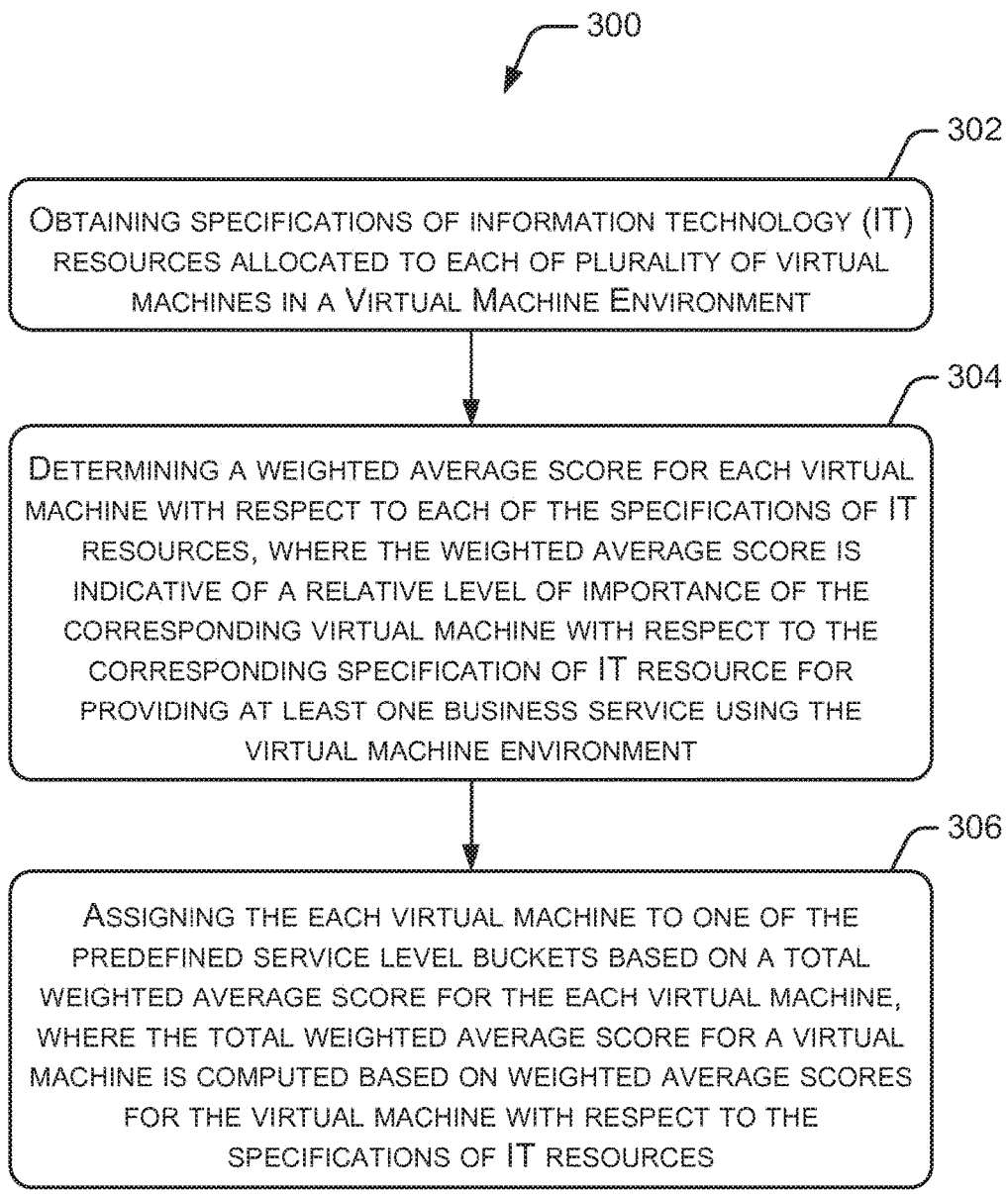
FIG. 3 illustrates a method of categorizing virtual machines of a virtual machine environment into predefined service level buckets, according to an example of the present subject matter.
Figure 4:
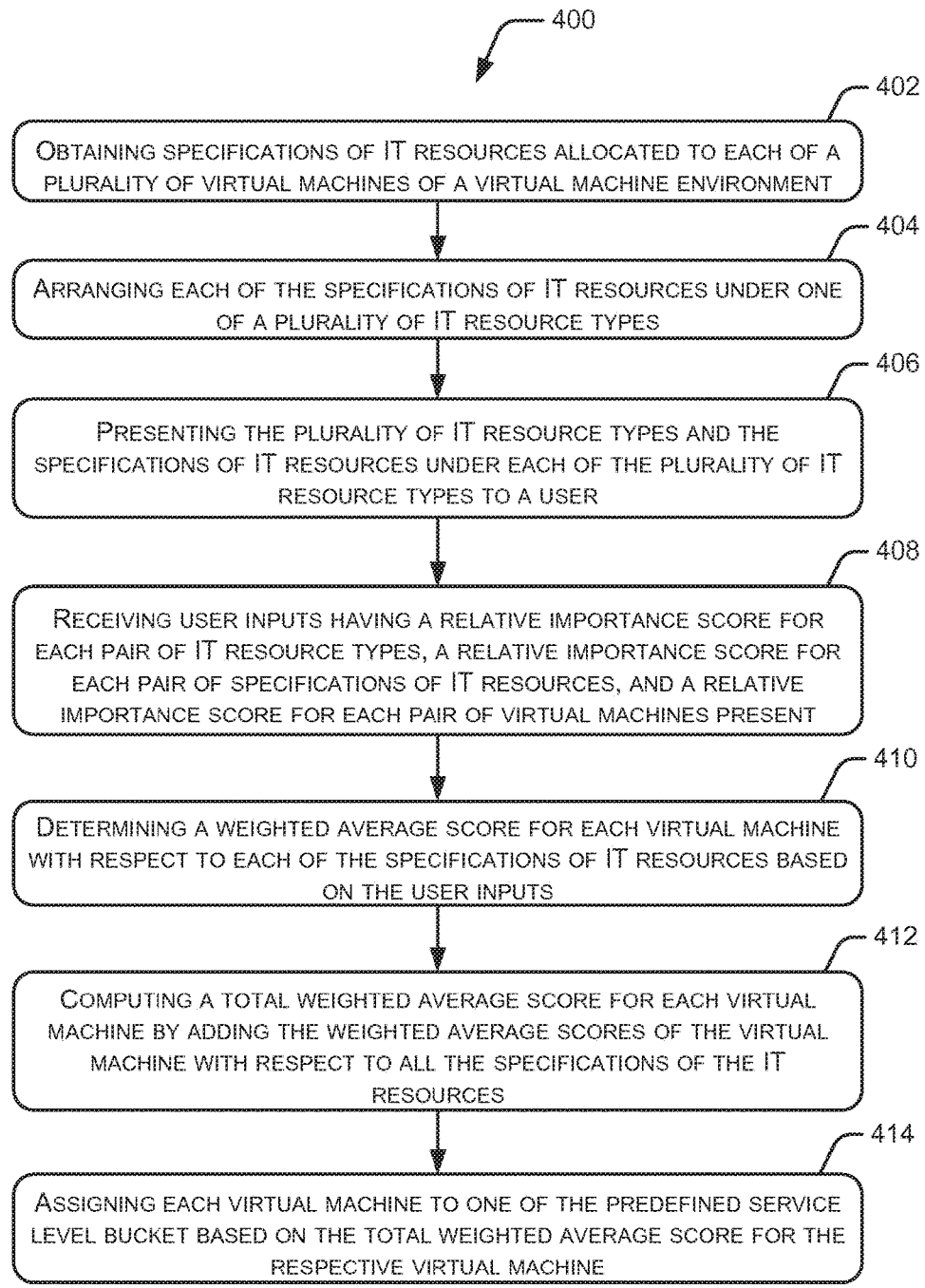
FIG. 4 illustrates a method of categorizing virtual machines of a virtual machine environment into predefined service level buckets, according to an example of the present subject matter.

FIG. 3 and FIG. 4 illustrate a method 300 and a method 400 of categorizing virtual machines of a virtual machine environment 100 into predefined service level buckets, according to examples of the present subject matter. The order in which the methods 300, 400 are described is not intended to be construed as a limitation, and any number of the described method blocks can be combined in any order to implement the methods 300, 400, or an alternative method. Furthermore, the methods 300, 400 can be implemented by processor(s) or computing device(s) through any suitable hardware, non-transitory machine readable instructions, or combination thereof.

It may be understood that steps of the methods 300, 400 can be performed by programmed computing devices. The steps of the methods 400 can be executed based on instructions stored in a non-transitory computer readable medium, as will be readily understood. The non-transitory computer readable medium may include, for example, digital memories, magnetic storage media, such as a magnetic disks and magnetic tapes, hard drives, or optically readable digital data storage media.

Further, although the methods 300, 400 of categorizing virtual machines of a virtual machine environment 100 may be implemented in a variety of computing devices working in different IT environments; in the example implementations described in FIG. 3 and FIG. 4, the methods 300, 400 are explained in context of the aforementioned virtual machine categorization system 102 in the virtual machine environment 100, for ease of explanation.

Referring to FIG. 3, at block 302, specifications of IT resources allocated to each of a plurality of virtual machines of the virtual machine environment 100 are obtained by the virtual machine categorization system 102. The specifications of IT resources for a virtual machine may be indicative of number of processors, size of processing memory, type of network devices, type of data storage, and such, allocated to the virtual machine.

At block 304, a weighted average score for each virtual machine with respect to each of the specifications of IT resources is determined. A weighted average score of a virtual machine with respect to a specification is indicative of a relative level of importance of the virtual machine with respect to the specification, for providing one or more business services using the virtual machine environment 100. The weighted average score may be determined based on user inputs indicative of a relative importance score of each specification of IT resource with respect to other specification of IT resource for providing the business services.

At block 306, for the purpose of categorization of the virtual machines, each virtual machine is assigned to one of predefined service level buckets based on a total weighted average score for the each virtual machine. The total weighted average score for a virtual machine is computed based on the weighted average scores of the virtual machines with respect to all the specifications of IT resources. Each of the predefined service level buckets is indicative of a set or a level of application based services that can be applied to the virtual machines categorized in that predefined service level bucket Examples of the predefined service level buckets and the application based services associated with each of the predefined service level buckets are illustrated in Table 1.

Referring to FIG. 4, at block 402, specifications of IT resources allocated to each of a plurality of virtual machines of the virtual machine environment 100 are obtained by the virtual machine categorization system 102. At block 404, each of the specifications of IT resources is arranged under one of a plurality of IT resource types. Examples of the IT resource types, and the specifications of IT resource arranged under the IT resource types, are illustrated in Table 2. After this, at block 406, the plurality of IT resource types and the specifications of IT resources under each of the plurality of IT resource types are presented by the virtual machine categorization system 102 to a user.

At block 408, user inputs having a relative importance score for each pair of IT resource types, a relative importance score for each pair of specifications of IT resources, and a relative importance score for each pair of virtual machines present in the virtual machine environment 100 are received by the virtual machine categorization system 102 from the user. The user inputs having the relative importance scores for the pairs of IT resource types, for the pairs of specifications of IT resources, and for the pairs of virtual machines, may be provided by the user based on a predefined scale of relative importance scores. An example of predefined scale of relative importance score is illustrated earlier in the description.

At block 410, a weighted average score for each virtual machine with respect to each of the specifications of IT resources is determined based on the user inputs. In an implementation, the weighted average score for a virtual machine with respect to a specification of IT resource may be determined as a value of global priority for that virtual machine, where the global priority is computed from the user inputs using the analytic hierarchy process.

At block 412, a total weighted average score for each virtual machine is computed by adding the weighted average scores of the virtual machine with respect to all the specifications of the IT resources. Further, at block 414, each virtual machine is assigned to one of the predefined service level bucket based on the total weighted average score for the respective virtual machine.

Figure 5:
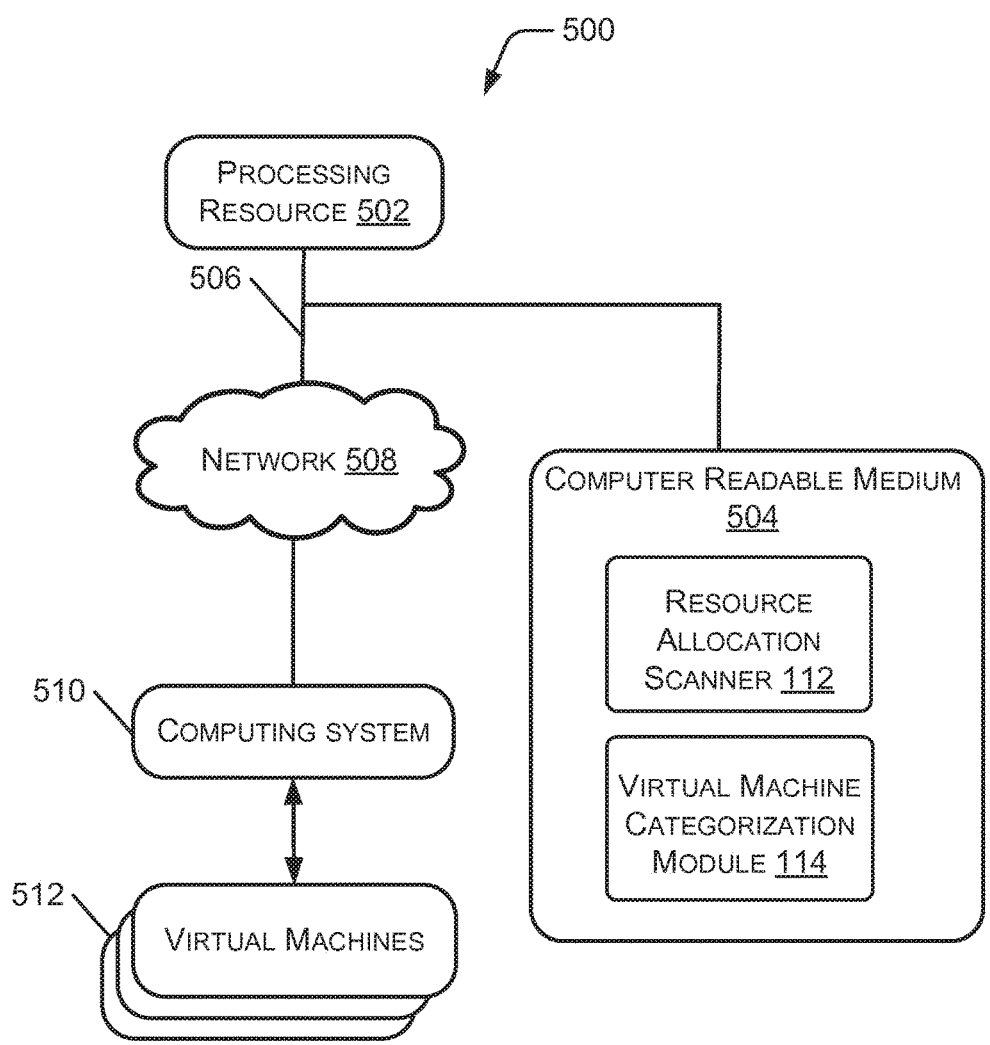
FIG. 5 illustrates a network environment for categorizing virtual machines of a virtual machine environment into predefined service level buckets, according to an example of the present subject matter.

FIG. 5 illustrates a network environment 500 for categorizing virtual machines of a virtual machine environment into predefined service level buckets, according to an example of the present subject matter. The network environment 500 may be a public networking environment or a private networking environment. In an example implementation, the network environment 500 includes a processing resource 502 communicatively coupled to a computer readable medium 504 through a communication link 506.

For example, the processing resource 502 can be a computing device, such as a computer. The computer readable medium 504 can be, for example, an internal memory device or an external memory device. In an example implementation, the communication link 506 may be a direct communication link, such as any memory read/write interface. In another example implementation, the communication link 506 may be an indirect communication link, such as a network interface. In such a case, the processing device 502 can access the computer readable medium 504 through a network 508. The network 508 may be a single network or a combination of multiple networks and may use a variety of different communication protocols.

The processing resource 502 and the computer readable medium 504 may also be communicatively coupled to a computing system 510 over the network 508. The computing system 510 is a system over which a plurality of virtual machines 512 may be run. The computing system 510 can include, for example, a server. The coupling with the computing system 510 enables in categorizing the virtual machines 512 into predefined service level buckets through the processing resource 502, in accordance with the present subject matter.

In an example implementation, the computer readable medium 504 includes a set of computer readable instructions, such as the resource allocation scanner 112 and the virtual machine categorization module 114. The set of computer readable instructions can be accessed by the processing resource 502 through the communication link 506 and subsequently executed to perform acts for categorizing virtual machines 512 into predefined service level buckets.

For example, the resource allocation scanner 112 can obtain specification of IT resources allocated to the virtual machines 512 for providing one or more business services. The virtual machine categorization module 114 can determine a weighted average score for each virtual machine 512 with respect to each of the specifications of IT resources, where the weighted average score of a virtual machine 512 with respect to a specification is indicative of a relative level of importance of the virtual machine 512 with respect to the specification for providing one or more business services. The weighted average score may be determined based on user inputs indicative of a relative importance score of each specification of IT resource with respect to other specification of IT resource for providing the business services.

The virtual machine categorization module 114 can compute a total weighted average score for each virtual machine 512 based on the weighted average scores for the each virtual machine 512 with respect to the specifications of IT resources. The virtual machine categorization module 114 can then assign each of virtual machines 512 to one of the predefined service level buckets based on the total weighted average score for the each virtual machine.

Although implementations for categorizing virtual machines of a virtual machine environment into predefined service level buckets have been described in language specific to structural features and/or methods, it is to be understood that the present subject matter is not necessarily limited to the specific features or methods described. Rather, the specific features and methods are disclosed and explained as example implementations for categorizing virtual machines of a virtual machine environment into predefined service level buckets.

We claim:

1. A method of categorizing each of a plurality of virtual machines of a virtual machine environment into one of predefined service level buckets, the method comprising:
    obtaining, by a computing device, specifications of information technology (IT) resources allocated to each of the plurality of virtual machines;
    determining a weighted average score for each virtual machine with respect to each of the specifications of IT resources, wherein the weighted average score is indicative of a relative level of importance of the corresponding virtual machine with respect to the corresponding specification of IT resource for providing at least one business service using the virtual machine environment;
    assigning the each virtual machine to one of the predefined service level buckets based on a total weighted average score for the each virtual machine, wherein the predefined service level buckets are indicative of different levels of application based services that are to be applied to the plurality of virtual machines, wherein the total weighted average score for a virtual machine is computed based on weighted average scores for the virtual machine with respect to the specifications of IT resources; and
    applying the different levels of application based services to the plurality of virtual machines based on the predefined service level buckets.

2. The method as claimed in claim 1, wherein the determining is based on user inputs indicative of a relative importance score of each specification of IT resource with respect to other specifications of IT resources, from amongst the specifications of the IT resources allocated to the plurality of virtual machines, for providing the at least one business service, wherein the user inputs and the determining of the weighted average score for the each virtual machine are based on a predefined decision making model.

3. The method as claimed in claim 1, wherein the determining comprises:
    arranging each of the specifications of IT resources under one of a plurality of IT resource types;
    presenting, by the computing device, the plurality of IT resource types and specifications of IT resources under each of the plurality of IT resource types to a user; and
    receiving, by the computing device, user inputs comprising:
    a relative importance score for each pair of IT resource types, from amongst the plurality of IT resource types, wherein the relative importance score of a pair of IT resource types is indicative of importance of one IT resource type with respect to other IT resource type of the pair for providing the at least one business service;
    a relative importance score of each pair of specifications of IT resources, from amongst the specifications of IT resources under the each IT resource type, wherein the relative importance score of a pair of specifications of IT resources is indicative of importance of one specification of IT resource with respect to other specification of IT resource of the pair for providing the at least one business service; and a relative importance score of each pair of virtual machines, from amongst the virtual machines in the virtual machines environment, wherein the relative importance score of a pair of virtual machines is indicative of importance of one virtual machine with respect to other virtual machine of the pair for providing the at least one business service.

4. The method as claimed in claim 3, wherein the weighted average score for each virtual machine is a value of global priority computed from the user inputs based on analytic hierarchy process.

5. The method as claimed in claim 1, wherein the obtaining comprises:
    scanning the virtual machine environment to identify the specifications of the IT resources allocated to the plurality of virtual machines.

6. The method as claimed in claim 1, wherein each of the predefined service level buckets is ranked based on a corresponding level of application based services.

7. A virtual machine categorization system for categorizing each of a plurality of virtual machines of a virtual machine environment into one of predefined service level buckets, the virtual machine categorization system comprising:
    a processor;
    a resource allocation scanner coupled to the processor to obtain specifications of information technology (IT) resources allocated to each of the plurality of virtual machines; and
    a virtual machine categorization module coupled to the processor to
        obtain user inputs indicative of a relative importance score of each specification of IT resource with respect to other specifications of IT resources, from amongst the specifications of the IT resources allocated to the plurality of virtual machines, for providing at least one business service using the virtual machine environment, wherein the user inputs are obtained to determine a weighted average score for each virtual machine with respect to each of the specifications of IT resources, wherein the weighted average score is indicative of a relative level of importance of the corresponding virtual machine with respect to the corresponding specification of IT resource for providing the at least one business service,
        assign the each virtual machine to one of the predefined service level buckets based on a total weighted average score for the each virtual machine, wherein the predefined service level buckets are indicative of different levels of application based services that are to be applied to the plurality of virtual machines, wherein the total weighted average score for a virtual machine is computed based on weighted average scores for the virtual machine with respect to the specifications of IT resources; and
        apply the different levels of application based services to the plurality of virtual machines based on the predefined service level buckets.

8. The virtual machine categorization system as claimed in claim 7, wherein the user inputs and the determination of the weighted average score for the each virtual machine are based on a predefined decision making model.

9. The virtual machine categorization system as claimed in claim 7, wherein the resource allocation scanner is coupled to the processor to arrange each of the specifications of IT resources under one of a plurality of IT resource types, and wherein the virtual machine categorization module is coupled to the processor to present the plurality of IT resource types and specifications of IT resources under each of the plurality of IT resource types to a user, and receive the user inputs comprising:

a relative importance score for each pair of IT resource types, from amongst the plurality of IT resource types, wherein the relative importance score of a pair of IT resource types is indicative of importance of one IT resource type with respect to other IT resource type of the pair for providing the at least one business service;

a relative importance score of each pair of specifications of IT resources, from amongst the specifications of IT resources under the each IT resource type, wherein the relative importance score of a pair of specifications of IT resources is indicative of importance of one specification of IT resource with respect to other specification of IT resource of the pair for providing the at least one business service; and a relative importance score of each pair of virtual machines, from amongst the virtual machines in the virtual machines environment, wherein the relative importance score of a pair of virtual machines is indicative of importance of one virtual machine with respect to other virtual machine of the pair for providing the at least one business service.

10. The virtual machine categorization system as claimed in claim 9, wherein virtual machine categorization system is coupled to the processor to determine the weighted average score for each virtual machine based on a value of global priority computed from the user inputs using analytic hierarchy process.

11. The virtual machine categorization system as claimed in claim 7, wherein each of the predefined service level buckets is ranked based on a corresponding level of application based services.

12. A non-transitory computer-readable medium comprising computer readable instructions that, when executed, cause a virtual machine categorization system to:

obtain specifications of information technology (IT) resources allocated to each of a plurality of virtual machines of a virtual machine environment;

determine a weighted average score for each virtual machine with respect to each of the specifications of IT resources, wherein the weighted average score is indicative of a relative level of importance of the corresponding virtual machine with respect to the corresponding specification of IT resource for providing at least one business service using the virtual machine environment;

compute a total weighted average score for each virtual machine based on weighted average scores for the each virtual machine with respect to the specifications of IT resources;

assign each of the plurality of virtual machine to one of predefined service level buckets based on the total weighted average score for the each virtual machine, wherein the predefined service level buckets are indicative of different levels of application based services that are to be applied to the plurality of virtual machines; and apply the different levels of application based services to the plurality of virtual machines based on the predefined service level buckets.

13. The non-transitory computer-readable medium as claimed in claim 12 comprising computer readable instructions that, when executed, cause the virtual machine categorization system to:

receive user inputs indicative of a relative importance score of each specification of IT resource with respect to other specifications of IT resources, from amongst the specifications of the IT resources allocated to the plurality of virtual machines, for providing the at least one business service is determined based on the user inputs.

14. The non-transitory computer-readable medium as claimed in claim 12 comprising computer readable instructions that, when executed, cause the virtual machine categorization system to:

scan the virtual machine environment to identify the specifications of the IT resources allocated to the plurality of virtual machines.

\* \* \* \* \*